US010568156B2

(12) United States Patent
Shibata et al.

(10) Patent No.: US 10,568,156 B2
(45) Date of Patent: Feb. 18, 2020

(54) COMMUNICATION DEVICE, NON-TRANSITORY COMPUTER-READABLE RECORDING MEDIUM STORING COMPUTER-READABLE INSTRUCTIONS FOR COMMUNICATION DEVICE, AND METHOD EXECUTED BY COMMUNICATION DEVICE

(71) Applicant: Brother Kogyo Kabushiki Kaisha, Nagoya-shi, Aichi-ken (JP)

(72) Inventors: Takeshi Shibata, Nagoya (JP); Hirotaka Asakura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/923,187

(22) Filed: Mar. 16, 2018

(65) Prior Publication Data
US 2018/0288820 A1   Oct. 4, 2018

(30) Foreign Application Priority Data
Mar. 31, 2017   (JP) ................. 2017-071007

(51) Int. Cl.
*H04W 76/14*      (2018.01)
*H04W 4/80*       (2018.01)
(Continued)

(52) U.S. Cl.
CPC .......... *H04W 76/14* (2018.02); *H04W 4/80* (2018.02); *H04W 48/16* (2013.01); *H04W 84/20* (2013.01); *H04W 12/06* (2013.01)

(58) Field of Classification Search
CPC ....... H04N 2201/0094; H04N 1/00307; H04N 1/32776; H04N 2201/0017; H04N 1/00233; G06F 3/1236; G06F 3/1292
See application file for complete search history.

(56) References Cited

U.S. PATENT DOCUMENTS

2014/0240776 A1   8/2014   Suzuki et al.
2015/0193183 A1*  7/2015   Ichikawa ............ G06F 3/1292
                                                      358/1.15
(Continued)

FOREIGN PATENT DOCUMENTS

JP   2014-168215 A   9/2014

OTHER PUBLICATIONS

Wi-Fi Alliance Technical Committee P2P Task Group, "Wi-Fi Peer-to-Peer (P2P) Technical Specification", Version 1.1, pp. 1-159, 2010.

*Primary Examiner* — Mansour Oveissi
(74) *Attorney, Agent, or Firm* — Banner & Witcoff, Ltd.

(57) ABSTRACT

A communication device may shift an operation state of the communication device from a specific state to a G/O state in a case where a first wireless connection via a first wireless interface is established with a first external device under a situation where the operation state of the communication device is the specific state and predetermined information is received from the first external device using the first wireless connection, and after the operation state of the communication device has shifted to the G/O state in response to receiving the predetermined information from the first external device, establish a second wireless connection via a second wireless interface with the first external device so as to cause the first external device to participate as a client in a first wireless network in which the communication device operates as a G/O.

10 Claims, 9 Drawing Sheets

(51) Int. Cl.
  *H04W 84/20* (2009.01)
  *H04W 48/16* (2009.01)
  *H04W 12/06* (2009.01)

(56) References Cited

U.S. PATENT DOCUMENTS

2015/0248266 A1　9/2015　Suzuki et al.
2016/0162239 A1　6/2016　Suzuki et al.

\* cited by examiner

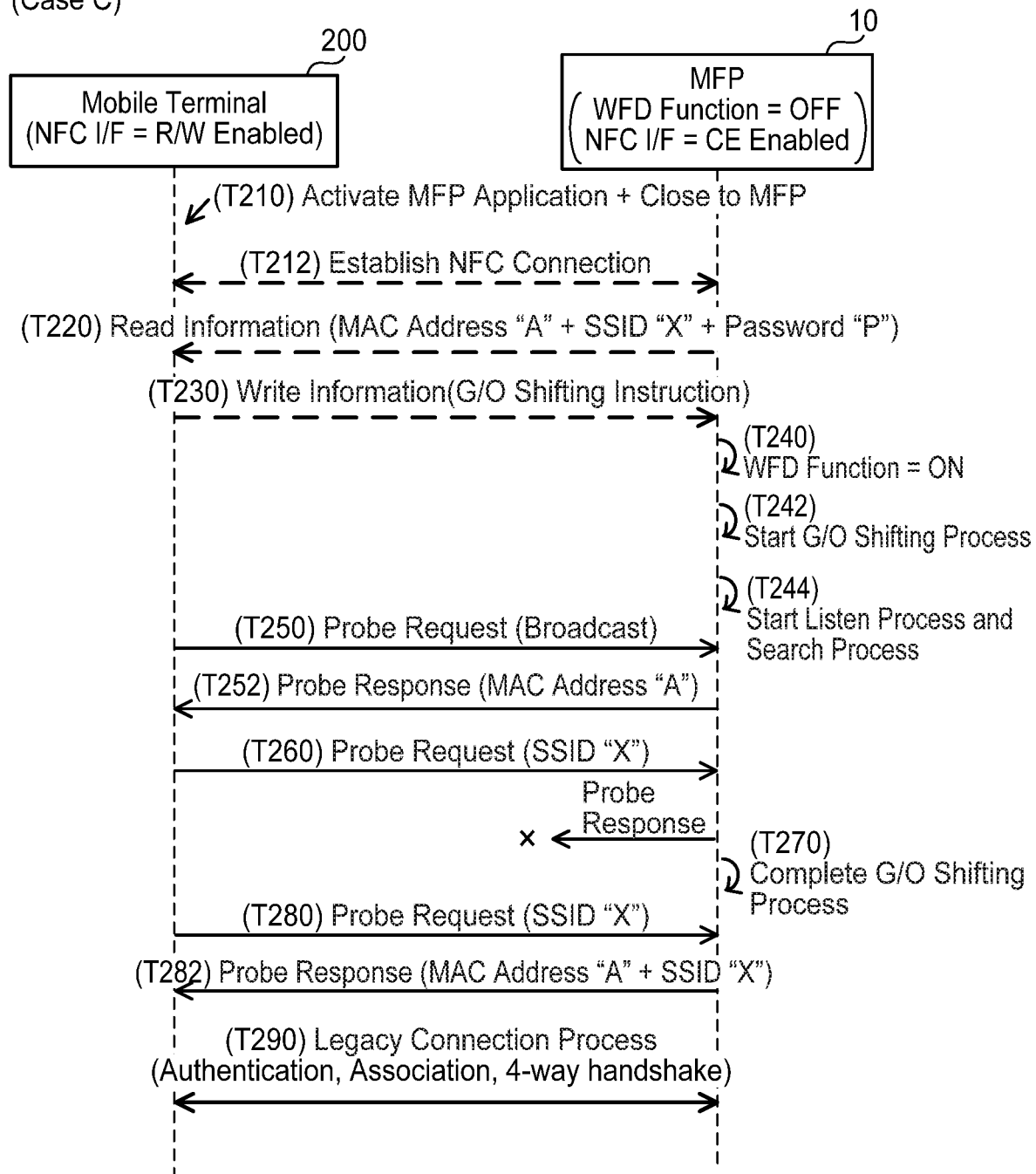

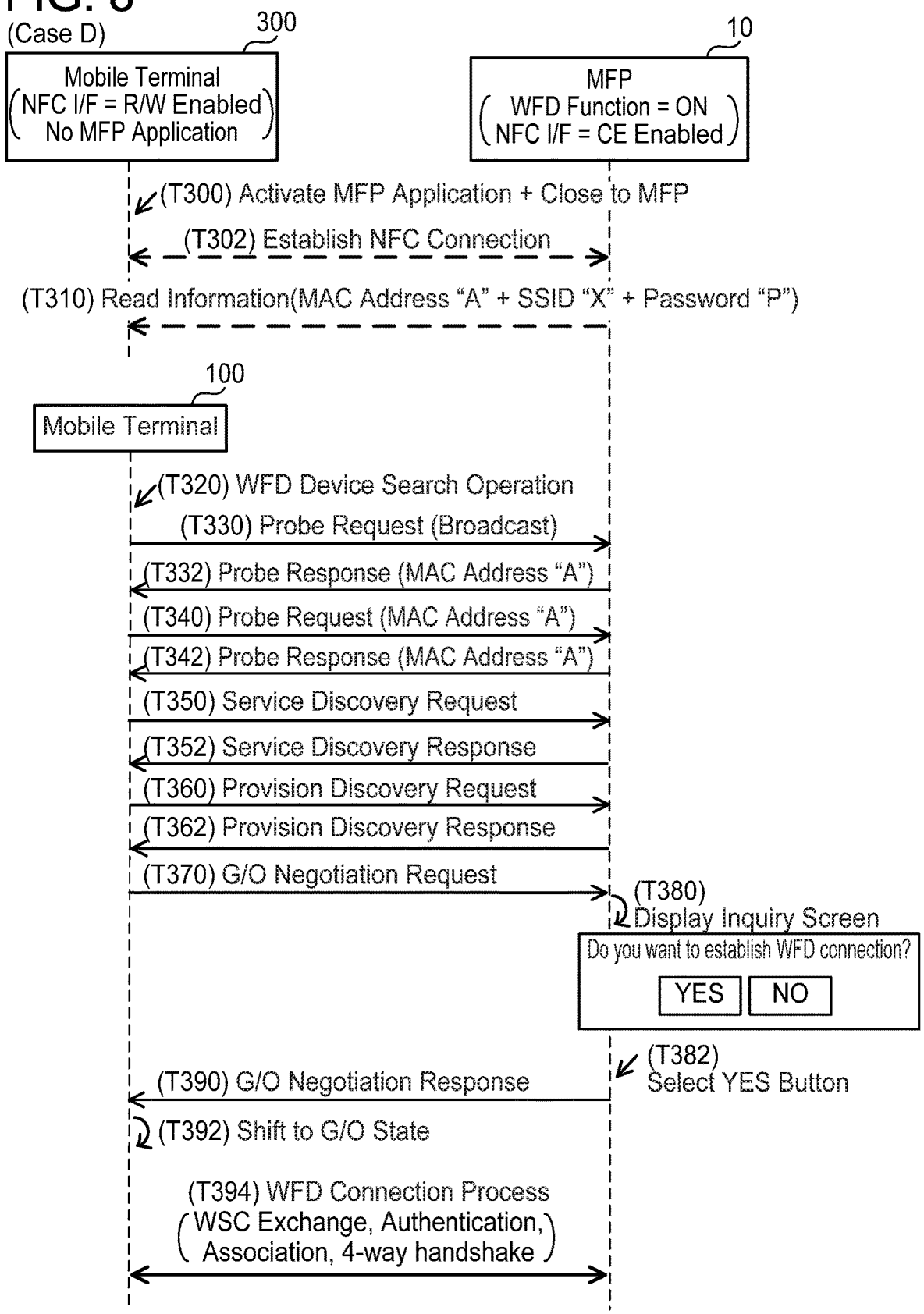

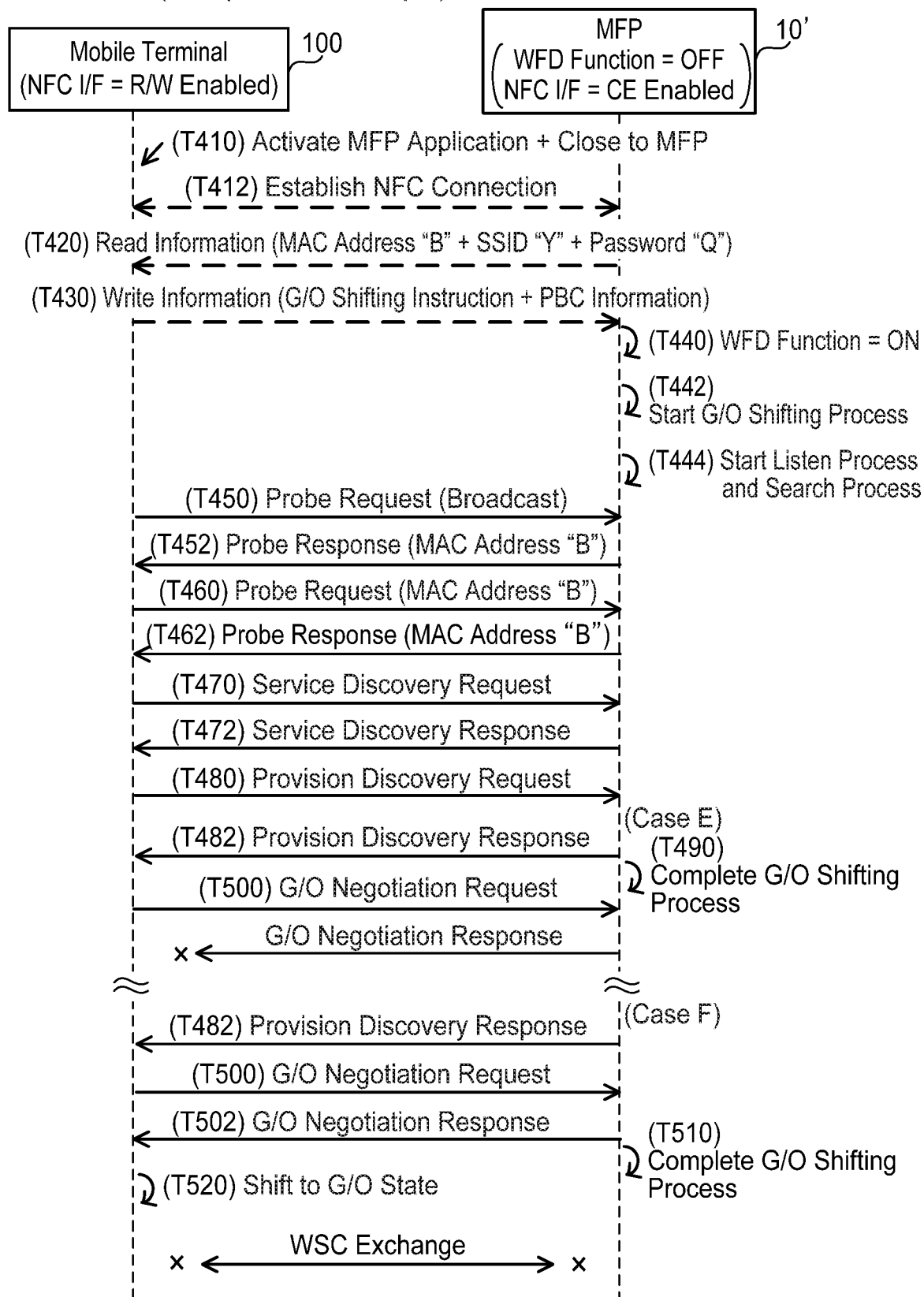
FIG. 9 (Comparative Example)

COMMUNICATION DEVICE, NON-TRANSITORY COMPUTER-READABLE RECORDING MEDIUM STORING COMPUTER-READABLE INSTRUCTIONS FOR COMMUNICATION DEVICE, AND METHOD EXECUTED BY COMMUNICATION DEVICE

TECHNICAL FIELD

The present disclosure discloses a communication device configured to be capable of shifting to a G/O (abbreviation of Group Owner) state of a WFD (abbreviation of Wi-Fi Direct (registered trademark)) scheme.

BACKGROUND ART

A communication system provided with a printer and a mobile terminal is known. When an NFC (abbreviation of Near Field Communication) link is established with the mobile terminal, the printer sends wireless setting information (such as an SSID (abbreviation of Service Set Identifier), a password, etc.), which is to be used in a WFD network, to the mobile terminal in response to receiving a read command from the mobile terminal. Upon sending the wireless setting information, the printer shifts to a G/O state of a WFD scheme to create a WFD network. Then, the printer establishes a wireless connection with the mobile terminal by using the wireless setting information, and causes the mobile terminal to participate in the WFD network as a client of the WFD scheme.

SUMMARY

In the above configuration, the printer shifts to the G/O state in response to receiving the read command and sending the wireless setting information to the mobile terminal. However, if preparation to establish the wireless connection with the printer is not completed in the mobile terminal, the printer cannot establish the wireless connection with the mobile terminal. In this case, the process of the printer shifting to the G/O state is wasted.

The disclosure herein discloses a technique for suppressing a processing load on a communication device from increasing.

A communication device disclosed herein may comprise a first wireless interface configured to execute a wireless communication with another device located at a first distance; a second wireless interface configured to execute a wireless communication according to a Wi-Fi scheme with another device located at a second distance, the second distance being greater than the first distance; a processor; and a memory storing computer-readable instructions therein, the computer-readable instructions, when executed by the processor, causing the communication device to: shift an operation state of the communication device from a specific state to a G/O (abbreviation of Group Owner) state of a WFD (abbreviation of Wi-Fi Direct (registered trademark)) scheme conforming to the Wi-Fi scheme, in a case where a first wireless connection via the first wireless interface is established with a first external device under a situation where the operation state of the communication device is the specific state, and predetermined information is received from the first external device using the first wireless connection, the specific state being different from the G/O state, the predetermined information being information that is sent from a device that has installed an application program for establishing a wireless connection via the second wireless interface with the communication device, wherein the operation state of the communication device is not shifted to the G/O state in a case where the first wireless connection is established with the first external device and the predetermined information is not received from the first external device using the first wireless connection; and after the operation state of the communication device has shifted to the G/O state in response to receiving the predetermined information from the first external device, establish a second wireless connection via the second wireless interface with the first external device so as to cause the first external device to participate as a client of the WFD scheme in a first wireless network in which the communication device operates as a G/O.

A control method for implementation of the aforementioned communication device, the aforementioned computer-readable instructions, and a non-transitory computer-readable recording medium storing the computer-readable instructions are also novel and useful. Further, a communication system which comprises the aforementioned communication device and an external device is also novel and useful.

BRIEF DESCRIPTION OF THE DRAWINGS

FIG. 6 shows a sequence diagram of a case B where an NFC connection is established in a state where the WFD function is ON.
FIG. 7 shows a sequence diagram of a case C where a Legacy connection is established.
FIG. 8 shows a sequence diagram of a case D where an inquiry screen is displayed.
FIG. 9 shows a sequence diagram of a comparative example.

EMBODIMENTS (Configuration of Communication System 2; FIG. 1)
As shown in FIG. 1, a communication system 2 comprises a multi-function peripheral (hereafter termed "MFP") 10 and a plurality of mobile terminals 100, 200, 300. Each of the devices 10, 100, 200, 300 is capable of executing a wireless communication according to a Wi-Fi scheme (hereafter termed "Wi-Fi communication") and a wireless communication according to an NFC (abbreviation of Near Field Communication) scheme (hereafter termed "NFC communication"). The MFP 10 and each of the mobile terminals 100, 300 are WFD devices capable of executing (i.e., supporting) a wireless communication according to a WFD (abbreviation of Wi-Fi Direct (registered trademark)) scheme conforming to the Wi-Fi scheme (hereafter termed "WFD communication"). The mobile terminal 200 is a Legacy device which is not capable of executing (i.e., does not support) the WFD communication.

Figure 1:
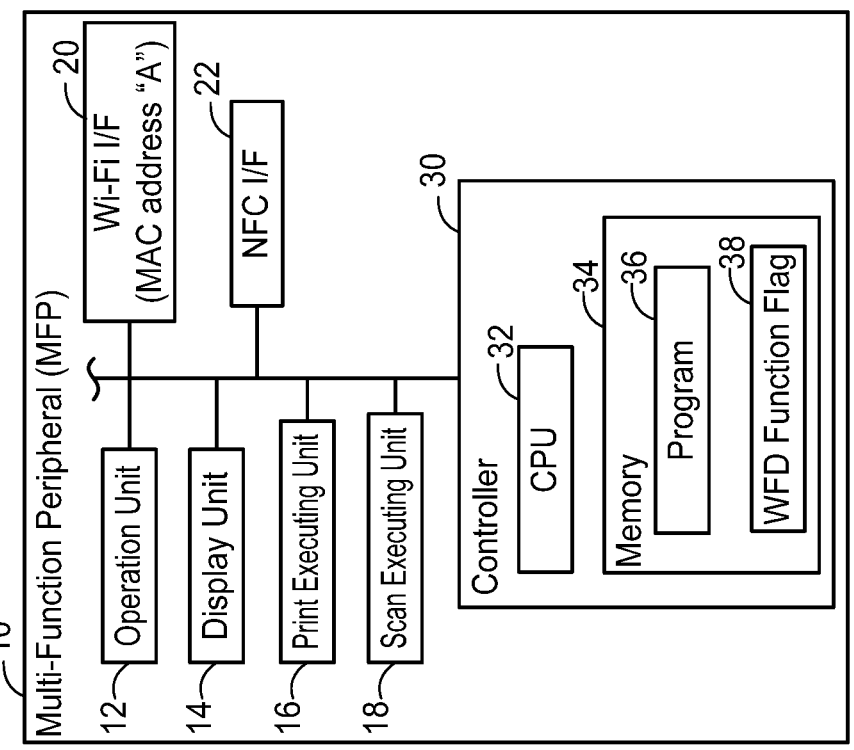
FIG. 1 shows a configuration of a communication system.

(Configuration of MFP 10)
The MFP 10 is a peripheral device (such as a peripheral device for the mobile terminal 100) capable of executing multiple functions including a print function and a scan function. The MFP 10 comprises an operation unit 12, a display unit 14, a print executing unit 16, a scan executing unit 18, a Wi-Fi interface 20, an NFC interface 22, and a controller 30. The respective units 12 to 30 are connected via a bus line (reference sign thereof is omitted). Hereafter, an interface will be denoted as "I/F".

The operation unit 12 includes a plurality of keys, and accepts user operations. The display unit 14 is a display for displaying various types of information. The print executing unit 16 includes a printing mechanism of an ink jet type, a laser type, or the like. The scan executing unit 18 is a scanning mechanism such as a CCD or a CIS.

The Wi-Fi I/F 20 is a wireless interface for executing a Wi-Fi communication according to the Wi-Fi scheme. The Wi-Fi I/F 20 is allocated with a MAC address "A". The Wi-Fi scheme is a wireless communication scheme for executing a wireless communication according to, for example, the 802.11 standard of the IEEE (abbreviation of the Institute of Electrical and Electronics Engineers, Inc.), and other standards complying therewith (such as 802.11a, 11b, 11g, 11n, etc.). The Wi-Fi I/F 20 especially supports the WFD scheme defined by the Wi-Fi Alliance, and is capable of executing a wireless communication according to the WFD scheme. That is, the MFP 10 is a WFD device. The WFD scheme is a wireless communication scheme described in the specification "Wi-Fi Peer-to-Peer (P2P) Technical Specification Version 1.1" created by the Wi-Fi Alliance. In the WFD specification, three states, namely a Group Owner state (hereafter termed "G/O state"), a client state, and a device state, are defined as states of a WFD device. A WFD device can operate selectively in any one of the aforementioned three states.

Further, the Wi-Fi I/F 20 supports a WPS (abbreviation of Wi-Fi Protected Setup) defined by the Wi-Fi Alliance. The WPS is a so-called automated wireless setting or an easy wireless setting, and it is a technique that is capable of establishing a wireless connection easily between a pair of devices even if wireless setting information (such as a password, authentication scheme, encryption scheme, etc.) for establishing the wireless connection according to the Wi-Fi scheme is not inputted by a user. Especially, the Wi-Fi I/F 20 supports a PBC (abbreviation of Push Button Configuration) scheme of the WPS. The PBC scheme is a scheme for establishing a wireless connection between a pair of devices in a case where a predetermined operation (such as an operation to press a button) is performed by the user on each of the pair of devices.

The NFC I/F 22 is an I/F for executing an NFC communication according to the NFC scheme. The NFC scheme is a wireless communication scheme based on, for example, the international standards such as ISO/IEC 14443, 15693, 18092, and the like. An I/F called an NFC forum device and an I/F called an NFC forum tag are known as types of I/Fs for executing the NFC communication. The NFC I/F 22 is an NFC forum device, and is an I/F capable of selectively operating in any one of a P2P (abbreviation of Peer To Peer) mode, an R/W (abbreviation of Reader/Writer) mode, and a CE (abbreviation of Card Emulation) mode. The present embodiment is explained by assuming that the NFC I/F 22 is to operate in the CE mode.

Here, differences between the Wi-Fi communication and the NFC communication will be described. A communication speed of the Wi-Fi communication (of which maximum communication speed is 11 to 600 Mbps, for example) is faster than a communication speed of the NFC communication (of which maximum communication speed is 100 to 424 Kbps, for example). Further, a carrier frequency of the Wi-Fi communication (which is either 2.4 GHz band or 5.0 GHz band, for example) differs from a carrier frequency of the NFC communication (which is 13.56 MHz band, for example). Further, a maximum distance with which the Wi-Fi communication can be executed (which is about 100 m at maximum) is greater than a maximum distance with which the NFC communication can be executed (which is about 10 cm at maximum).

The controller 30 includes a CPU 32 and a memory 34. The CPU 32 is configured to execute various types of processes according to a program 36 stored in the memory 34. The memory 34 is constituted of a volatile memory, a nonvolatile memory, and the like. Further, the memory 34 stores a WFD function flag 38 which indicates whether or not the MFP 10 is capable of executing an operation according to the WFD scheme. The WFD function flag 38 is set to a value which is one of "ON" meaning that the MFP 10 is capable of executing an operation according to the WFD scheme, and "OFF" meaning that the MFP 10 is incapable of executing that operation.

(Configuration of Mobile Terminal 100)

The mobile terminal 100 is a carriable terminal device such as a cell phone, a smart phone, a PDA, a laptop PC, a tablet PC, a portable music player, a portable movie player, or the like. The mobile terminal 100 includes an operation unit 112, a display unit 114, a Wi-Fi I/F 120, an NFC I/F 122, and a controller 130. The respective units 112 to 130 are connected via a bus line (reference sign thereof is omitted).

The operation unit 112 includes a plurality of keys. The user can input various instructions to the mobile terminal 100 by operating the operation unit 112. The display unit 114 is a display for displaying various types of information. The display unit 114 also functions as a so-called touch panel. That is, the display unit 114 functions also as an operation unit.

The Wi-Fi I/F 120 is similar to the Wi-Fi I/F 20, and supports the WFD scheme. That is, the mobile terminal 100 is a WFD device. Further, the NFC I/F 122 is similar to the NFC I/F 22, except for an assumption that the NFC I/F 122 is to operate in the R/W mode.

The controller 130 includes a CPU 132 and a memory 134. The CPU 132 executes various processes according to an OS (abbreviation of Operating System) program 136 stored in the memory 134. The memory 134 is constituted of a volatile memory, nonvolatile memory, and the like. The OS program 136 is a program for realizing basic operations of the mobile terminal 100. The memory 134 further stores an MFP application (hereafter termed "MFP app") 140. The MFP app 140 is an application for causing the MFP 10 to execute various functions. The MFP app 140 may be installed to the mobile terminal 100, for example, from a server on the Internet provided by a vendor of the MFP 10, or may be installed to the mobile terminal 100 from a medium shipped with the MFP 10.

(Configurations of other Mobile Terminals 200, 300)

The mobile terminal 200 includes almost the same configuration as that of the mobile terminal 100. However, a Wi-Fi I/F of the mobile terminal 200 does not support the WFD scheme. That is, the mobile terminal 200 is a Legacy device. Further, the mobile terminal 300 includes almost the same configuration as that of the mobile terminal 100. However, a memory of the mobile terminal 300 does not store the MFP app 140.

Figure 2:
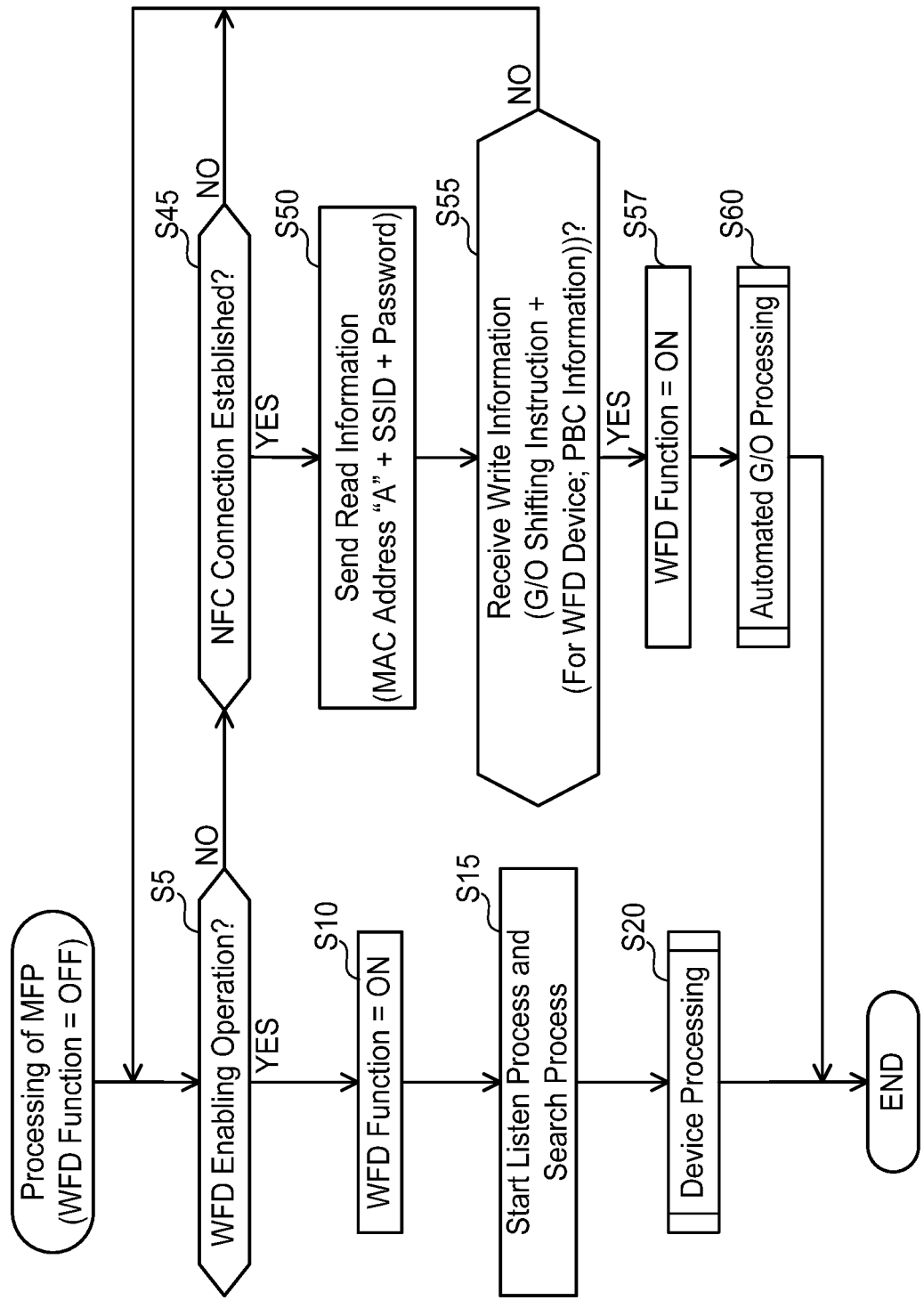
FIG. 2 shows a flow chart of processing to be executed by an MFP.

(Processing Executed by MFP 10: FIG. 2)

Next, processing executed by the CPU 32 of the MFP 10 will be described with reference to FIG. 2. This processing is executed in a state where the WFD function flag 38 is set to "OFF".

In S5, the CPU 32 monitors whether a WFD enabling operation is executed on the operation unit 12. The WFD enabling operation is an operation for changing the WFD function flag 38 from "OFF" to "ON". In a case where the WFD enabling operation is executed (YES in S5), the CPU 32 proceeds to S10.

In S10, the CPU 32 changes the WFD function flag 38 from "OFF" to "ON". Then, in S15, the CPU 32 supplies an LS (abbreviation of Listen Search) starting instruction for starting a Listen process and a Search process to the Wi-Fi I/F 20. The LS starting instruction includes an instruction for setting a duration of the Listen process and a duration of the Search process. Here, each of the duration of the Listen process and the duration of the Search process is set to a value greater than zero. Due to this, the Wi-Fi I/F 20 executes the Listen process over the duration thereof and then executes the Search process over the duration thereof repeatedly, according to the instruction included in the LS starting instruction. That is, the Wi-Fi I/F 20 repeats executing the Listen process and the Search process, alternately. Due to this, an operation state of the MFP 10 shifts to the device state of the WFD scheme, that is, a state in which the MFP 10 executes an operation according to the WFD scheme. The Listen process is a process of sending a Probe response in response to receiving a Probe request. Further, the Search process is a process of monitoring receipt of a Probe response in response to sending a Probe request.

Figure 3:
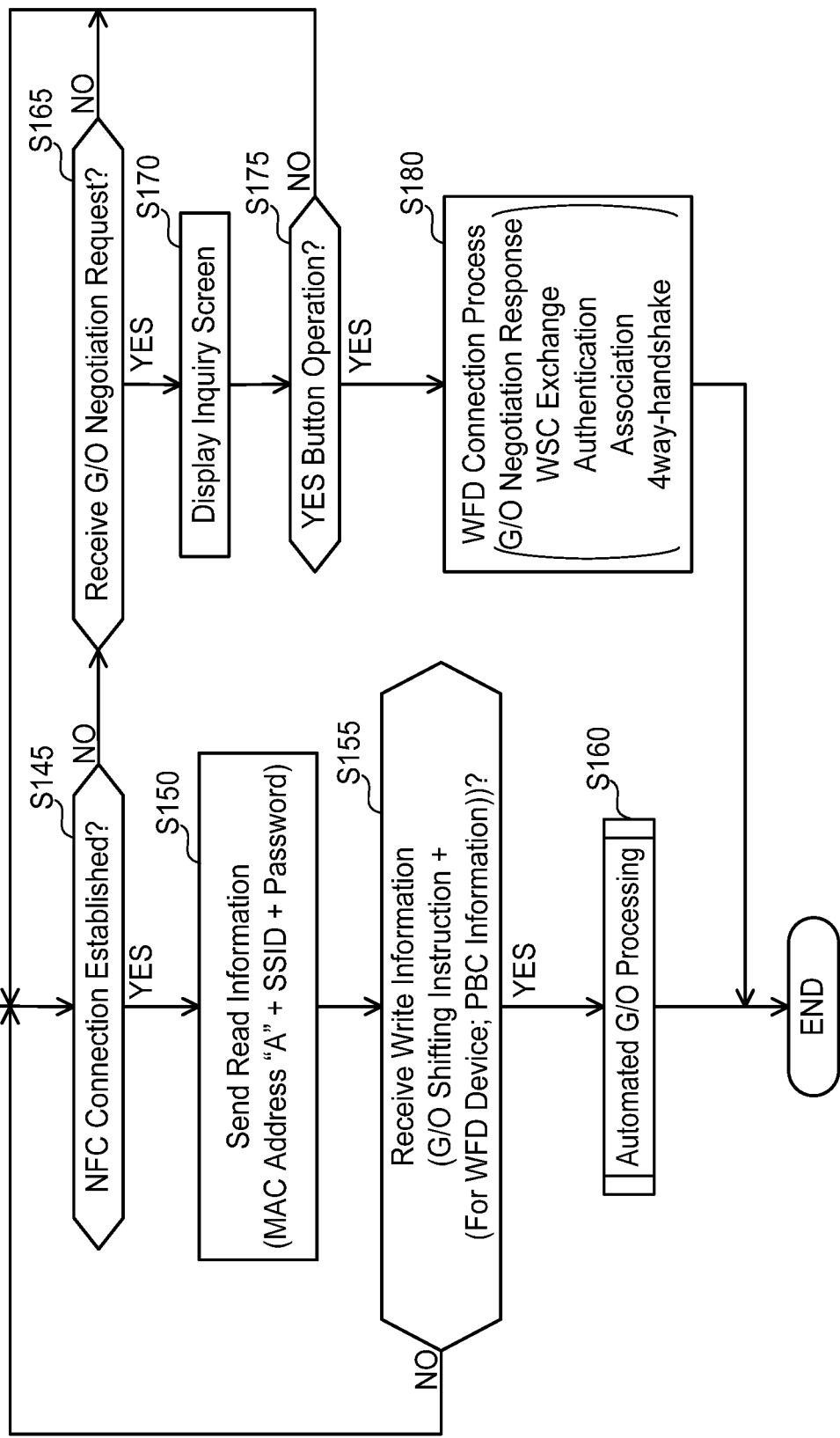
FIG. 3 shows a flow chart of device processing.

In S20, the CPU 32 executes device processing (see FIG. 3). The device processing is processing executed during when the operation state of the MFP 10 is the device state.

Further, in S45, the CPU 32 monitors whether a wireless connection (hereafter termed "NFC connection") is established between the NFC I/F 22 and an NFC I/F (e.g., 122) of a mobile terminal (e.g., 100). In a case of acquiring information that indicates an NFC connection has been established from the NFC I/F 22, the CPU 32 determines YES in S45 and proceeds to S50. Hereafter, the mobile terminal with which the NFC connection has been established will be termed "target mobile terminal".

As aforementioned, the present embodiment is explained by assuming the case where the NFC I/F 22 of the MFP 10 operates in the CE mode, and the NFC I/F of the target mobile terminal operates in the R/W mode. Thus, the target mobile terminal can send, to the MFP 10, a Read command according to a Reader mode of the R/W mode and a Write command according to a Writer mode of the R/W mode. The Read command is a command for requesting the MFP 10 to read out information (that is, to send Read information to the target mobile terminal). The Write command is a command for requesting the MFP 10 to write information (that is, to receive Write information from the target mobile terminal). In S50, the CPU 32 sends Read information to the target mobile terminal in response to receiving a Read command from the target mobile terminal using the NFC connection established in S45. The Read information includes the MAC address "A" of the MFP 10, and wireless setting information to be used in a wireless network (hereafter termed "WFD network") in which the MFP 10 operates as the G/O. The wireless setting information includes an SSID (abbreviation of Service Set Identifier) which is an identifier for identifying the WFD network, and a password which is used for authentication and encryption in the WFD network.

Figure 4:
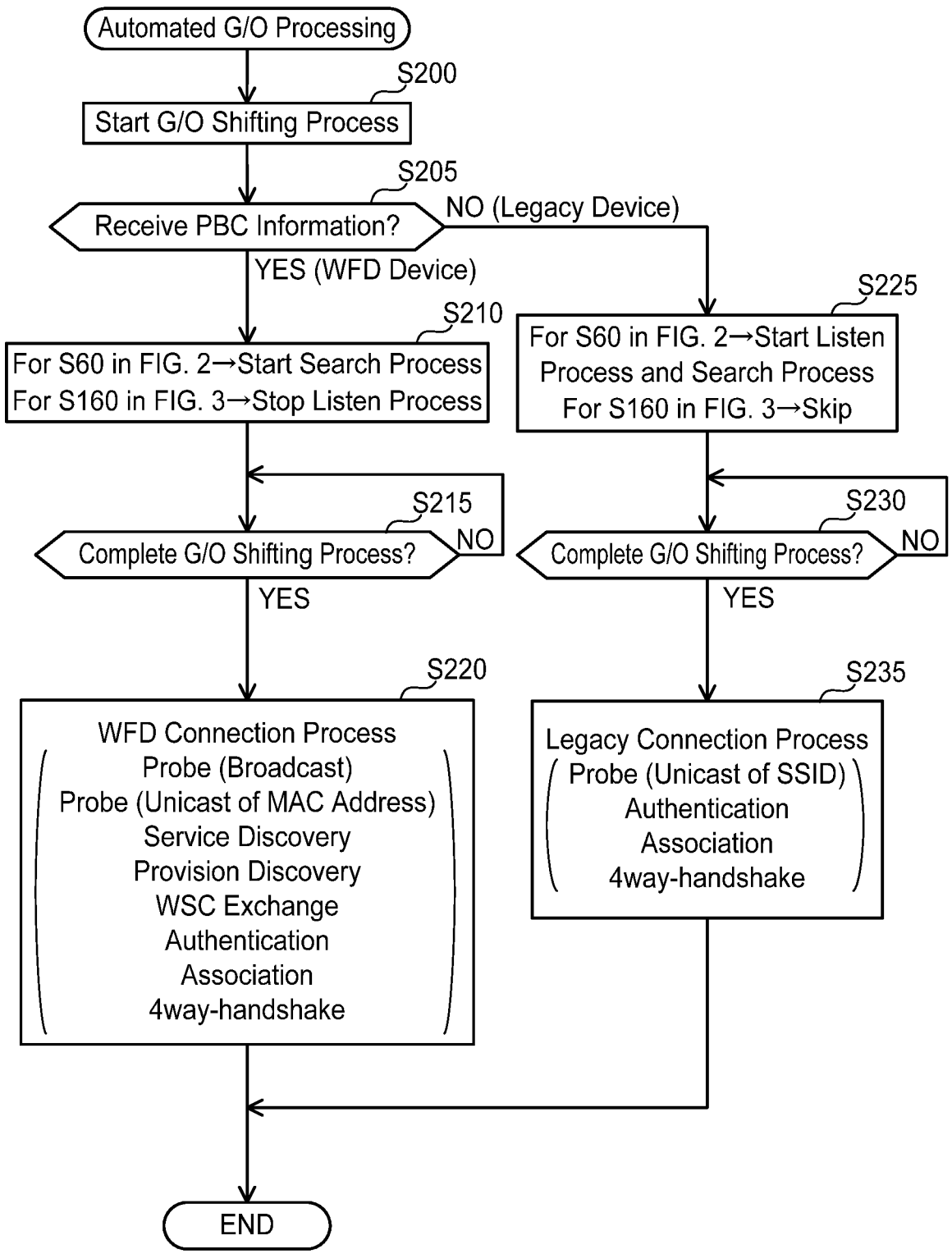
FIG. 4 shows a flow chart of automated G/O processing.

The aforementioned wireless setting information is generated according to the below procedure. Upon when a power of the MFP 10 is turned on, the CPU 32 generates wireless setting information and stores it in the memory 34. Then, the CPU 32 forms a WFD network in which the wireless setting information is to be used in a case where the MFP 10 operates as the G/O in S180 of FIG. 3 to be described later, or in a case where processing of FIG. 4 is executed. After this, the CPU 32 generates new wireless setting information upon when the current WFD network vanishes, and stores the new wireless setting information instead of the old wireless setting information in the memory 34. Due to this, in S180 of FIG. 3 or in the processing of FIG. 4, the CPU 32 forms a WFD network in which the new wireless setting information is to be used. As such, prior to forming a WFD network, the CPU 32 generates wireless setting information to be used in this WFD network, and sends the Read information including this wireless setting information to the target mobile terminal in S50 of FIG. 2. It should be noted that in a variant, the CPU 32 may generate wireless setting information each time a WFD network is formed, and may delete the wireless setting information from the memory 34 when the WFD network vanishes.

In S55, the CPU 32 monitors whether Write information is received from the target mobile terminal using the NFC connection established in S45. The Write information is information to be sent from a device in which the MFP app 140 has already been installed, and includes a G/O shifting instruction for shifting the operation state of the MFP 10 to the G/O state. In a case where the target mobile terminal is a WFD device, the Write information further includes PBC information. The PBC information is information indicating that the target mobile terminal supports the PBC scheme. On the other hand, in a case where the target mobile terminal is a Legacy device, the Write information does not include the PBC information. In a case where the Write information is received from the target mobile terminal (YES in S55), the CPU 32 proceeds to S57, or in a case where the Write information is not received from the target mobile terminal before a predetermined time has elapsed since the Read information was sent in S50 (NO in S55), the CPU 32 returns to the monitorings of S5 and S45.

S57 is same as S10. In S60, the CPU 32 executes automated G/O processing (see FIG. 4). The automated G/O processing is processing executed in the case where the Write information is received from the target mobile terminal.

(Device Processing: FIG. 3)

Next, details of the device processing executed in S20 of FIG. 2 will be described with reference to FIG. 3. In an initial state of FIG. 3, the operation state of the MFP 10 is the device state, and the Wi-Fi I/F 20 is repeating the executions of the Listen process and the Search process alternately.

S145 is same as S45 of FIG. 2. S150 and S155, which are executed in a case of YES in S145, are same as S50 and S55 of FIG. 2. The CPU 32 proceeds to S160 in a case of receiving Write information from the target mobile terminal (YES in S155), or returns to S145 in a case of not receiving Write information from the target mobile terminal (NO in S155). S160 is same as S60 of FIG. 2 (i.e., the processing of FIG. 4).

As aforementioned, since the Wi-Fi I/F 20 is executing the Listen process, in response to receiving a Probe request sent by broadcast from a mobile terminal, the Wi-Fi I/F 20 sends a Probe response to the mobile terminal. Hereafter, the mobile terminal that is the sender of the Probe request will be termed "specific mobile terminal". The Probe response includes the MAC address "A" of the MFP 10. After this, the Wi-Fi I/F 20 resends a Probe response to the specific mobile terminal in a case of receiving a Probe request including the MAC address "A" from the specific mobile terminal. In this case, the Wi-Fi I/F 20 executes, with the specific mobile terminal, receipt of a Service Discovery request, sending of a response thereto, receipt of a Provision Discovery request, and sending of a response thereto. Next, the Wi-Fi I/F 20 receives a G/O Negotiation request from the specific mobile terminal. The G/O Negotiation request is a command for requesting execution of a G/O Negotiation, which is a communication for determining which one of the MFP 10 and the specific mobile terminal is to become the G/O. In S165, the CPU 32 monitors whether the G/O Negotiation request is received from the specific mobile terminal via the Wi-Fi I/F 20. In a case of receiving the G/O Negotiation request (YES in S165), the CPU 32 proceeds to S170.

In S170, the CPU 32 displays an inquiry screen on the display unit 14. The inquiry screen is a screen for inquiring the user whether or not a WFD connection with the specific mobile terminal is to be established. The inquiry screen includes a YES button indicating that the WFD connection is to be established.

In S175, the CPU 32 determines whether or not the YES button in the inquiry screen has been operated. The CPU 32 determines YES in S175 in a case where the YES button is operated, and proceeds to S180. On the other hand, the CPU 32 determines NO in S175 in a case where the YES button is not operated, that is, in a case where a button indicating that the WFD connection is not to be established is selected, and returns to the monitorings of S145 and S165. Due to this, a WFD connection which the user does not intend can be suppressed from being established.

In S180, the CPU 32 executes a WFD connection process for establishing a WFD connection with the specific mobile terminal. Specifically, the CPU 32 supplies an WFD connection establishing instruction to the Wi-Fi I/F 20. Due to this, the Wi-Fi I/F 20 executes the G/O Negotiation by sending a G/O Negotiation response to the specific mobile terminal, and determines which one of the MFP 10 and the specific mobile terminal is to become the G/O. The Wi-Fi I/F 20 further executes communications of various signals (WSC Exchange, Authentication, Association, 4-way handshake, etc.) with the specific mobile terminal.

For example, in a case where the specific mobile terminal is determined to become the G/O in the G/O Negotiation, the CPU 32 receives, from the specific mobile terminal via the Wi-Fi I/F 20, an SSID and a password to be used in a WFD network in which the specific mobile terminal operates as the G/O in the WSC Exchange communication according to the PBC scheme of the WPS. In this case, the Wi-Fi I/F 20 further sends the received SSID and password to the specific mobile terminal in a course of executing the communications of Authentication, Association, and 4-way handshake with the specific mobile terminal. Then, an authentication of the SSID and the password succeeds in the specific mobile terminal, as a result of which the CPU 32 establishes a WFD connection with the specific mobile terminal and participates as a client of the WFD scheme in the WFD network in which the specific mobile terminal operates as the G/O.

Further, for example, in a case where the MFP 10 is determined to become the G/O in the G/O Negotiation, the CPU 32 sends an SSID and a password stored in the memory 34 to the specific mobile terminal via the Wi-Fi I/F 20 in the WSC Exchange communication. The Wi-Fi I/F 20 further receives the SSID and the password from the specific mobile terminal in the course of executing the communications of Authentication, Association, and 4-way handshake with the specific mobile terminal. An authentication of the received SSID and password is executed, and when this authentication succeeds, the CPU 32 establishes a WFD connection with the specific mobile terminal to cause the specific mobile terminal to participate as a client of the WFD scheme in the WFD network in which the MFP 10 operates as the G/O.

(Automated G/O Processing: FIG. 4)

Next, details of the automated G/O processing executed in S60 of FIG. 2 and S160 of FIG. 3 will be described with reference to FIG. 4.

In S200, the CPU 32 starts a G/O shifting process. Specifically, the CPU 32 supplies a G/O starting instruction for starting an operation as the G/O (for example, sending a beacon signal for checking presence of a child station) to the Wi-Fi I/F 20. Due to this, the Wi-Fi I/F 20 attempts to start the operation, however, it takes about 1 to 2 seconds before completion of this operation. That is, at the time of S200, the operation state of the MFP 10 is not yet the G/O state.

In S205, the CPU 32 determines whether or not the Write information received in S55 of FIG. 2 or S155 of FIG. 3 includes the PBC information. In a case of determining that the Write information includes the PBC information, that is, in a case of determining that the target mobile terminal is the WFD device, the CPU 32 determines YES in S205 and proceeds to S210. In a case of determining that the Write information does not include the PBC information, that is, in a case of determining that the target mobile terminal is the Legacy device, the CPU 32 determines NO in S205 and proceeds to S225.

In S210, the CPU 32 supplies a prohibition instruction for prohibiting the Listen process to the Wi-Fi I/F 20. Specifically, for example, in S210 in the automated G/O processing of S60 of FIG. 2, the CPU 32 supplies the LS starting instruction to the Wi-Fi I/F 20 similarly to S15 of FIG. 2. However, the LS starting instruction herein includes an instruction to set zero as the duration of the Listen process (i.e., the prohibition instruction), and an instruction to set a value greater than zero as the duration of the Search process. Due to this, the Wi-Fi I/F 20 executes only the Search process without executing the Listen process according to the instructions included in the LS starting instruction. Further, for example, when S210 in the automated G/O processing of S160 of FIG. 3 is executed, the Wi-Fi I/F 20 has already started executing the Listen process and the Search process. In this case, the CPU 32 supplies the setting instruction to set zero as the duration of the Listen process (i.e., the prohibition instruction) to the Wi-Fi I/F 20. Due to this, the Wi-Fi I/F 20 changes the duration of the Listen process to zero according to this setting instruction. That is, the Wi-Fi I/F 20 stops the Listen process and executes only the Search process.

As aforementioned, in the present embodiment, since the CPU 32 supplies the instruction for setting zero as the duration of the Listen process to the Wi-Fi I/F 20, the Wi-Fi I/F 20 does not receive a Probe request. Instead of this, a configuration of a comparative example may be considered in which the CPU 32 supplies an instruction for setting a value greater than zero as the duration of the Listen process to the Wi-Fi I/F 20, and further supplies an instruction for ignoring a Probe request even when received, to the Wi-Fi I/F 20. In this case, the Wi-Fi I/F 20 receives the Probe request but does not send a Probe response, as a result of which the Listen process is prohibited. However, in the configuration of the comparative example, since the special instruction for ignoring the Probe request is supplied to the Wi-Fi I/F 20, the Wi-Fi I/F 20 must be programmed to execute an operation according to such an instruction. Contrary to this, the Wi-Fi I/F 20 supporting the WFD scheme is normally capable of executing the operation according to the instruction for setting the duration of the Listen process. According to the present embodiment, the Listen process is prohibited using such a normal instruction, and thus the Listen process can be prohibited easily as compared to the configuration of the comparative example. In a variant, the configuration of the aforementioned comparative example may be employed.

In S215, the CPU 32 monitors whether the G/O shifting process has been completed. Specifically, the CPU 32 determines YES in S215 and proceeds to S220 in a case of acquiring, from the Wi-Fi I/F 20, information that indicates the operation as the G/O (such as sending the beacon signal for checking presence of a child station) has started. When the operation as the G/O is started, the Wi-Fi I/F 20 stops the Search process, and further starts a response process of sending a Probe response in response to receiving a Probe request. The response process is a process similar to the Listen process, however, in the WFD specification, the Listen process is defined as a process executed in the device state. Thus, in the present embodiment, the process of sending the Probe response after the G/O shifting process has been completed in S215 will be termed the response process, instead of calling it the Listen process.

In S220, the CPU 32 executes the WFD connection process for establishing a WFD connection with the target mobile terminal. Specifically, the CPU 32 supplies a WFD connection establishing instruction to the Wi-Fi I/F 20. Due to this, in response to receiving a Probe request sent by broadcast from the target mobile terminal, the Wi-Fi I/F 20 sends a Probe response including the MAC address "A" and the same SSID as that in S50 of FIG. 2 or S150 of FIG. 3 to the target mobile terminal. Next, the Wi-Fi I/F 20 sends a Probe response to the target mobile terminal in response to receiving a Probe request including the MAC address "A" (i.e., Probe request sent by unicast) from the target mobile terminal. The Wi-Fi I/F 20 further executes communications of various signals (Service Discovery, Provision Discovery, WSC Exchange, Authentication, Association, 4-way handshake, etc.) with the target mobile terminal. The CPU 32 sends, to the target mobile terminal, the SSID and the password that are same as the SSID and the password sent in S50 of FIG. 2 or S150 of FIG. 3 in the WSC Exchange communication. Then, the CPU 32 receives the SSID and the password sent by the WSC Exchange from the target mobile terminal in the course of the aforementioned communications of the various signals. An authentication of the received SSID and password is executed, and when this authentication succeeds, the CPU 32 establishes a WFD connection with the target mobile terminal. Due to this, the CPU 32 can cause the target mobile terminal to participate as a client in the WFD network in which the MFP 10 operates as the G/O.

On the other hand, in the case where the target mobile terminal is the Legacy device (NO in S205), the CPU 32 proceeds to S225. In S225 in the automated G/O processing of S60 of FIG. 2, the CPU 32 supplies the LS starting instruction to the Wi-Fi I/F 20 similarly to S15 of FIG. 2. Further, when S225 in the automated G/O processing of S160 of FIG. 3 is executed, S225 is skipped since the Wi-Fi I/F 20 has already started executing the Listen process and the Search process.

S230 is same as S215, and the CPU 32 proceeds to S235 in a case of YES in S230. In S235, the CPU 32 executes a Legacy connection process for establishing a Legacy connection with the target mobile terminal. Specifically, the CPU 32 supplies a Legacy connection establishing instruction to the Wi-Fi I/F 20. Due to this, the Wi-Fi I/F 20 sends a Probe response to the target mobile terminal in response to receiving a Probe request including the SSID same as that in S50 of FIG. 2 or S150 of FIG. 3 (i.e., Probe request sent by unicast) from the target mobile terminal. Since the target mobile terminal had already received the SSID and the password in S50 of FIG. 2 or S150 of FIG. 3, it can send the aforementioned Probe request including this SSID to the MFP 10. The Wi-Fi I/F 20 further executes communications of various signals (Authentication, Association, 4-way handshake, etc.) with the target mobile terminal. That is, unlike S220, the CPU 32 does not execute the WSC Exchange. However, since the target mobile terminal had already received the SSID and the password in S50 of FIG. 2 or S150 of FIG. 3, it is capable of acknowledging the SSID and the password even when the WSC Exchange is not executed. The CPU 32 receives the SSID and the password that are same as those in S50 of FIG. 2 or S150 of FIG. 3 from the target mobile terminal in the course of the aforementioned communications of the various signals. An authentication of the received SSID and password is executed, and when this authentication succeeds, the CPU 32 establishes a Legacy connection with the target mobile terminal. Due to this, the CPU 32 can cause the target mobile terminal to participate as a legacy in the WFD network in which the MFP 10 operates as the G/O.

As aforementioned, the CPU 32 can appropriately establish the WFD connection or the Legacy connection with the target mobile terminal in S220 or S235. Especially, since the CPU 32 prohibits the Listen process in S210, the establishment of the WFD connection with the target mobile terminal can be suppressed from failing due to a Probe request being sent. Further, in the case of receiving the Write information from the target mobile terminal, the CPU 32 establishes the WFD connection or the Legacy connection with the target mobile terminal without displaying the inquiry screen of S170 of FIG. 3. Since the user does not have to execute an operation following the inquiry screen, user convenience can be improved.

(Specific Cases: FIGS. 5 to 8)

Next, specific cases which are realized according to the processing of FIGS. 2 to 4 will be described with reference to FIGS. 5 to 8. In FIGS. 5 to 8, dashed arrows and solid arrows between the MFP 10 and the respective mobile terminals 100, 200, 300 indicate the NFC communication and the Wi-Fi communication, respectively. Further, for easier understanding hereinbelow, operations executed by the CPUs 32, 132, and the like of the respective devices 10, 100, 200, 300 will not be described with the CPUs as the subject of action, but instead, will be described with the devices (i.e., the MFP 10 and the respective mobile terminals 100, 200, 300) as the subject of action.

Figure 5:
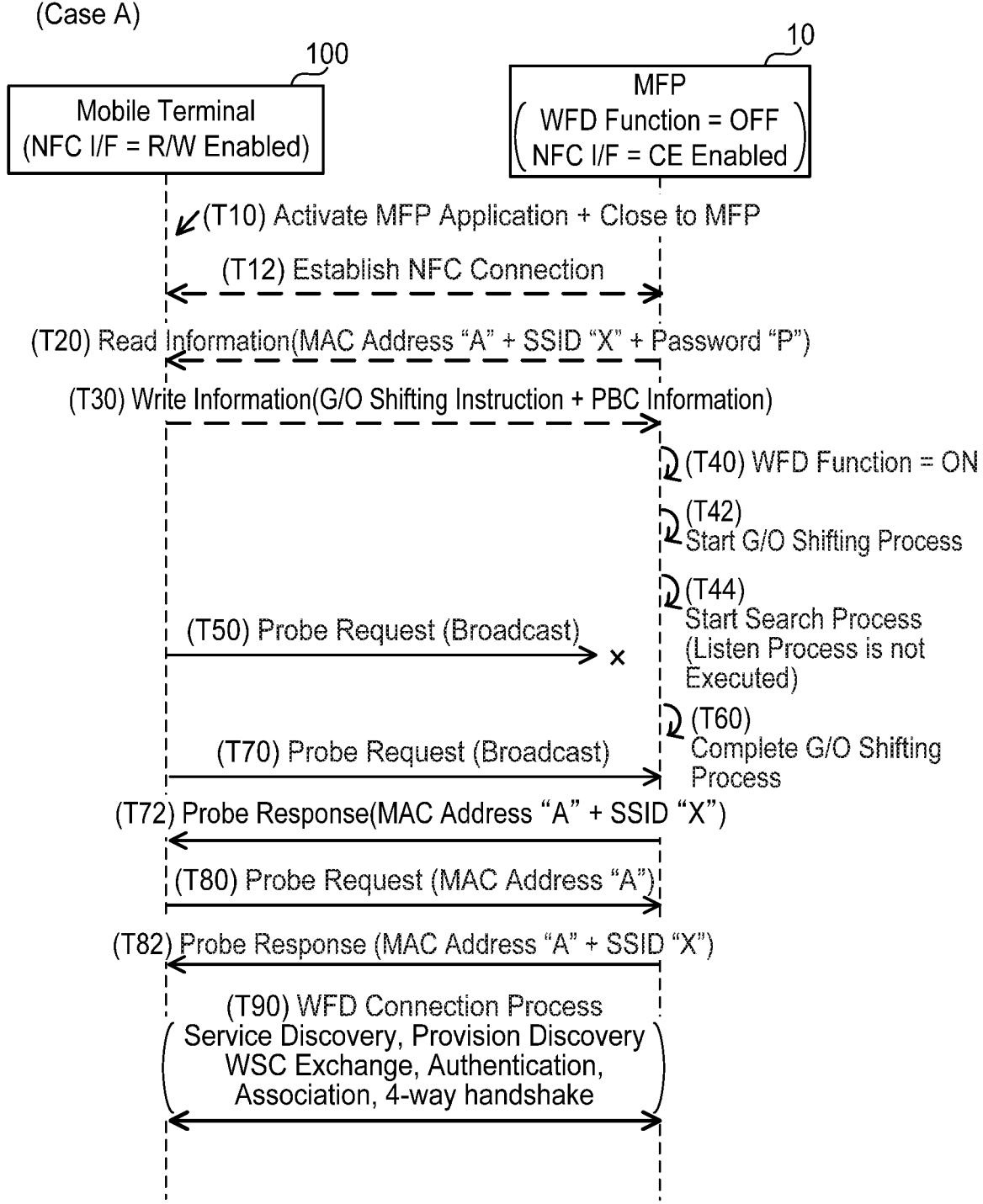
FIG. 5 shows a sequence diagram of a case A where an NFC connection is established in a state where a WFD function is OFF.

(Process of Case A, where NFC connection is established while WFD function is OFF: FIG. 5)

Firstly, with reference to FIG. 5, a case A where an NFC connection is established between the MFP 10 and the mobile terminal 100 in a state where the WFD function flag 38 of the MFP 10 is set to "OFF", that is, in a state where the MFP 10 cannot execute an operation according to the WFD scheme will be described.

In T10, the user activates the MFP app 140 by using the operation unit 112 of the mobile terminal 100, and brings the mobile terminal 100 close to the MFP 10. Due to this, an NFC connection is established between the MFP 10 and the mobile terminal 100 in T12 (YES in S45 of FIG. 2).

In T20, the MFP 10 sends the Read information to the mobile terminal 100 in response to receiving the Read command from the mobile terminal 100 using the NFC connection (S50). This Read information includes the MAC address "A", an SSID "X", and a password "P".

In T30, the MFP 10 receives the Write information from the mobile terminal 100 (YES in S55). This Write information includes the G/O shifting instruction and the PBC information. In T40, the MFP 10 changes the WFD function flag 38 from "OFF" to "ON" (S57).

The MFP 10 executes the automated G/O processing in response to receiving the Write information from the mobile terminal 100 (S60). Firstly, in T42, the MFP 10 starts the G/O shifting process (S200 of FIG. 4). Further, since the received Write information includes the PBC information (YES in S205), the MFP 10 does not execute the Listen process but executes only the Search process in T44 (S210). Accordingly, the MFP 10 does not receive a Probe request sent by broadcast from the mobile terminal 100 in T50. As a result of this, the MFP 10 does not send a Probe response to the mobile terminal 100.

In T60, the MFP 10 completes the G/O shifting process and starts the operation as the G/O (YES in S215). Due to this, in response to receiving a Probe request, the MFP 10 can execute the response process of sending a Probe response. Thus, in response to receiving a Probe request sent by broadcast from the mobile terminal 100 in T70, the MFP 10 sends a Probe response to the mobile terminal 100 in T72 (S220). This Probe response includes the MAC address "A" and the SSID "X".

The mobile terminal 100 receives a Probe response from each of one or more devices including the MFP 10. In this case, the mobile terminal 100 can acknowledge that the MFP 10, which is the connection target, is present by identifying the Probe response including the SSID "X" received in T20 from among the one or more Probe responses. Then, the mobile terminal 100 sends, to the MFP 10, a Probe request including the MAC address "A" included in the Probe response, that is, a Probe request including the MAC address "A" received in T20 as a destination (i.e., Probe request sent by unicast).

In response to receiving the Probe request including the MAC address "A" from the mobile terminal 100 in T80, the MFP 10 sends a Probe response to the mobile terminal 100 in T82 (S220). At this timing, the MFP 10 has already started the operation as the G/O in the WFD network in which the SSID "X" is used, and thus the Probe response includes not only the MAC address "A" but also the SSID "X". Due to this, the mobile terminal 100 can be notified of the presence of the WFD network in which the SSID "X" is used, that is, the fact that the MFP 10 is operating as the G/O.

Next, in T90, the MFP 10 executes communications of various signals (Service Discovery, Provision Discovery, WSC Exchange, Authentication, Association, 4-way handshake, etc.) with the mobile terminal 100 (S220). Due to this, the MFP 10 establishes a WFD connection with the mobile terminal 100 to cause the mobile terminal 100 to participate as a client in the WFD network in which the MFP 10 operates as the G/O. Although not shown in the drawings, the MFP 10 can execute a communication of target data (such as print data, scan data, etc.) with the mobile terminal 100 using the WFD connection.

Figure 6:
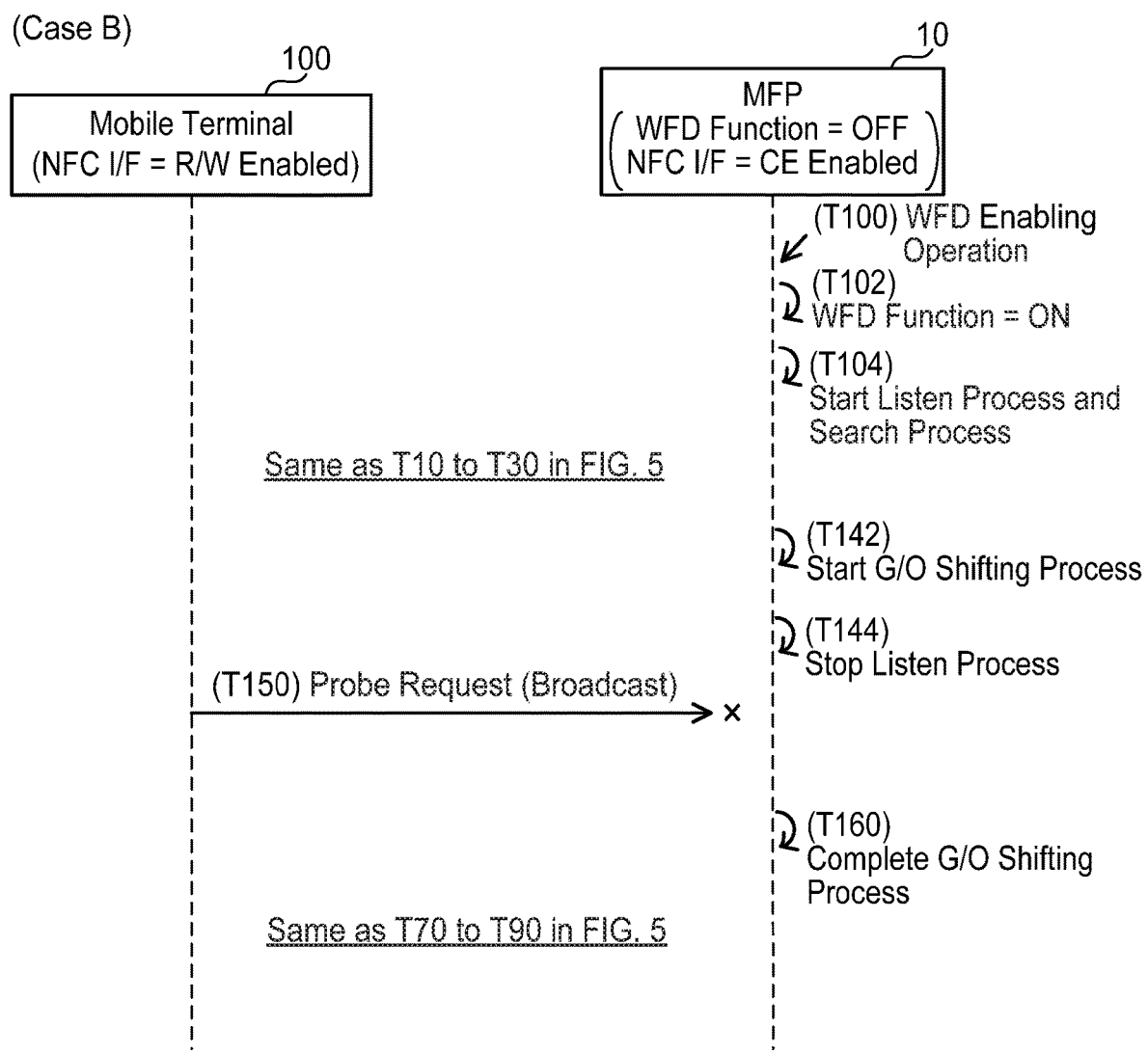

(Process of Case B, where NFC connection is established while WFD function is ON: FIG. 6)

Next, with reference to FIG. 6, a case B where an NFC connection is established between the MFP 10 and the mobile terminal 100 in a state where the WFD function flag 38 of the MFP 10 is set to "ON", that is, in a state where the MFP 10 can execute the operation according to the WFD scheme will be described.

In T100, the user performs the WFD enabling operation on the MFP 10 (YES in S5 of FIG. 2). In this case, the MFP 10 changes the WFD function flag 38 from "OFF" to "ON" in T102 (S10), and in T104, repeats executing the Listen process and the Search process alternatively (S15). Due to this, the operation state of the MFP 10 shifts to the device state, and the MFP 10 executes the device processing (S20).

T10 to T30 of FIG. 6 are same as T10 to T30 of FIG. 5 (S145 to S155 of FIG. 3). Further, T142 to T160 are same as T42 to T60 of FIG. 5. However, in T144, the MFP 10 stops the Listen process since it has already started executing the Listen process (S210 of FIG. 4). T70 to T90 of FIG. 6 are same as T70 to T90 of FIG. 5.

(Process of Case C, where Legacy connection is established: FIG. 7)

Next, with reference to FIG. 7, a case C where a Legacy connection is established between the MFP 10 and the mobile terminal 200 will be described.

T210 to T230 are same as T10 to T30 of FIG. 5, except for that the communication counterpart is the mobile terminal 200 instead of the mobile terminal 100, and that the PBC information is not included in the Write information of T230 since the mobile terminal 200 is a Legacy device.

The MFP 10 changes the WFD function flag 38 from "OFF" to "ON" (S57 of FIG. 2) in T240, and starts the G/O shifting process (S200 of FIG. 4) in T242. Since the Write information of T230 does not include the PBC information (NO in S205), the MFP 10 starts both of the Listen process and the Search process (S225) in T244.

Since the MFP 10 is executing the Listen process, in response to receiving a Probe response sent by broadcast from the mobile terminal 200 in T250, the MFP 10 sends a Probe response to the mobile terminal 200 in T252. This Probe response includes the MAC address "A". At this timing, since the MFP 10 has not yet started the operation as the G/O of the WFD network in which the SSID "X" is used, the Probe response does not include the SSID "X".

The mobile terminal 200 receives a Probe response from each of one or more devices including the MFP 10. In this case, the mobile terminal 200 can acknowledge that the MFP 10, which is the connection target, is present by identifying the Probe response including the MAC address "A" received in T220 from among the one or more Probe responses. As aforementioned, the mobile terminal 100, which is the WFD device, sends the Probe request including the MAC address "A" as the destination (T80 of FIG. 5). Contrary to this, the mobile terminal 200, which is the Legacy device, sends a Probe request including the SSID "X" received in T220 (i.e., Probe request sent by unicast) to the MFP 10.

In T260, the MFP 10 receives the Probe request including the SSID "X" from the mobile terminal 200. However, at this timing, the MFP 10 has not yet started the operation as the G/O of the WFD network in which the SSID "X", which was included in the Probe request, is used. Due to this, the MFP 10 does not send a Probe response to the mobile terminal 200.

T270 is same as T60 of FIG. 5. Since the MFP 10 has started the operation as the G/O of the WFD network in which the SSID "X" is used, in response to receiving the Probe request including the SSID "X" again from the mobile terminal 200 in T280, the MFP 10 sends a Probe request including the MAC address "A" and the SSID "X" to the mobile terminal 200 in T282 (S235). Due to this, the mobile terminal 200 can be notified of the presence of the WFD network in which the SSID "X" is used, that is, the fact that the MFP 10 is operating as the G/O.

Next, in T290, the MFP 10 executes communications of various signals (Authentication, Association, 4-way handshake, etc.) with the mobile terminal 200 (S235). Due to this, the MFP 10 establishes a Legacy connection with the mobile terminal 200 to cause the mobile terminal 200 to participate as a legacy in the WFD network in which the MFP 10 operates as the G/O.

As shown in the case C, the MFP 10 does not prohibit the Listen process in the case where its counterpart with which the NFC connection is established is the mobile terminal 200 which is the Legacy device (T244). Although the MFP 10 does not prohibit the Listen process, it does not send a Probe response even when receiving the Probe request including the SSID "X" as the destination from the mobile terminal 200 in T260. Due to this, the establishment of the Legacy connection with the mobile terminal 200 can be suppressed from failing due to a Probe response being sent. However, in a variant, the MFP 10 may prohibit the Listen process in T244.

(Process of Case D, where Inquiry Screen is Displayed: FIG. 8)

Next, a case D where the MFP 10 operating in the device state, that is, the MFP 10 executing the device processing of S20 of FIG. 2 (i.e., the processing of FIG. 3) displays the inquiry screen in response to receiving a G/O Negotiation request from the mobile terminal 100 will be described. In an initial state of FIG. 8, since the operation state of the MFP 10 is the device state, the MFP 10 is executing the Listen process and the Search process.

T300 to T310 are same as T10 to T20 of FIG. 5, except for that the communication counterpart is the mobile terminal 300 instead of the mobile terminal 100. Here, since the mobile terminal 300 does not store the MFP app 140, the MFP 10 does not receive Write information from the mobile terminal 300 (NO in S155 of FIG. 3). Accordingly, the operation state of the MFP 10 remains as the device state, and thus the MFP 10 does not establish a WFD connection with the mobile terminal 300.

In T320, the user executes, on the mobile terminal 100, a WFD device search operation for searching a WFD device in a surrounding of the mobile terminal 100. As a result, in T330, the mobile terminal 100 sends a Probe request by broadcast.

In response to receiving the Probe request sent by broadcast from the mobile terminal 100 in T330, the MFP 10 sends a Probe response to the mobile terminal 100 in T332. This Probe response includes the MAC address "A". Although not shown, the Probe response further includes a device name of the MFP 10.

The mobile terminal 100 receives a Probe response from each of one or more devices including the MFP 10. The Probe response received from the MFP 10 includes the device name of the MFP 10. Further, for example, a Probe response received from an access point includes an SSID of a wireless network formed by this access point. Although not shown, the mobile terminal 100 displays one or more device names and/or SSIDs included in the one or more Probe responses, and accepts a selection of the device name of the MFP 10. In this case, the mobile terminal 100 sends a Probe request including the MAC address "A" as the destination (i.e., Probe request sent by unicast) to the MFP 10.

In response to receiving the Probe request including the MAC address "A" from the mobile terminal 100 in T340, the MFP 10 sends a Probe response including the MAC address "A" but not including an SSID to the mobile terminal 100 in T342. Due to this, the mobile terminal 100 can be notified that the MFP 10 is not operating as the G/O. Therefore, the mobile terminal 100 can acknowledge that the G/O Negotiation is to be executed to establish a WFD connection with the MFP 10 being in the device state.

Next, in response to receiving a Service Discovery request from the mobile terminal 100 in T350, the MFP 10 sends a Service Discovery response to the mobile terminal 100 in T352. Then, in response to receiving a Provision Discovery request from the mobile terminal 100 in T360, the MFP 10 sends a Provision Discovery response to the mobile terminal 100 in T362.

In T370, the MFP 10 receives a G/O Negotiation request from the mobile terminal 100 (YES in S165). In this case, in T380, the MFP 10 displays the inquiry screen on the display unit 14 (S170). The inquiry screen includes the YES button indicating that a WFD connection is to be established, and a NO button indicating that a WFD connection is not to be established.

In response to the YES button in the inquiry screen being selected by the user in T382 (YES in S175), the MFP 10 sends a G/O Negotiation response to the mobile terminal 100 and executes the G/O Negotiation with the mobile terminal 100 in T390 (S180). In this case, as a result of the G/O Negotiation, the mobile terminal 100 is determined to become the G/O, and in T392, the mobile terminal 100 starts the operation as the G/O.

In T394, the MFP 10 executes communications of various signals (WSC Exchange, Authentication, Association, 4-way handshake etc.) with the mobile terminal 100 (S180). As a result, the MFP 10 establishes a WFD connection with the mobile terminal 100, and participates as a client in a WFD network in which the mobile terminal 100 operates as the G/O.

(Comparative Example: FIG. 9)

Next, a case where an MFP 10' of the comparative example fails to establish a WFD connection will be described with reference to FIG. 9. The MFP 10' of the comparative example includes substantially the same configuration as the MFP 10 of the present embodiment, however, it does not supply the prohibition instruction to its Wi-Fi I/F in S210 of FIG. 4. That is, the MFP 10' executes the Listen process during a period from a start of the G/O shifting process to an end thereof. Further, the Wi-Fi I/F of the MFP 10' is allocated with a MAC address "B". Further, in a WFD network in which the MFP 10' operates as the G/O, an SSID "Y" and a password "Q" are used.

T410 to T442 are same as T10 to T42 of FIG. 5 except for that the MAC address "B", the SSID "Y", and the password "Q" are included in the Read information of T420. In T444, the MFP 10' starts each of the Listen process and the Search process. As a result, during the period until the G/O shifting process is completed, in response to receiving a Probe request sent by broadcast from the mobile terminal 100 in T450, the MFP 10' sends a Probe response including the MAC address "B" to the mobile terminal 100 in T452.

Next, in response to receiving a Probe request including the MAC address "B" from the mobile terminal 100 (i.e., Probe request sent by unicast) in T460, the MFP 10' sends a Probe response to the mobile terminal 100 in T462. At this timing, the MFP 10' has not yet started the operation as the G/O of the WFD network in which the SSID "Y" is used. Thus, the Probe response includes the MAC address "B" but does not include the SSID "Y". Due to this, the mobile terminal 100 can be notified that the MFP 10' is not operating as the G/O. Due to this, the mobile terminal 100 can acknowledge that the G/O Negotiation is to be executed to establish a WFD connection with the MFP 10' being in the device state. T470 to T482 thereafter are same as T350 to T362 of FIG. 8.

(Case E)

In a case E, the MFP 10' completes the G/O shifting process in T490 and starts the operation as the G/O. However, as aforementioned, since the mobile terminal 100 operates to execute the G/O Negotiation, the MFP 10' receives a G/O Negotiation request from the mobile terminal 100 in T500. However, since the operation state of the MFP 10' is the G/O state, the MFP 10' does not send a G/O Negotiation response to the mobile terminal 100. Thus, the processes following the WSC Exchange are not executed, and the establishment of a WFD connection between the MFP 10' and the mobile terminal 100 thereby fails.

(Case F)

A case F differs from the case E regarding a timing to complete the G/O shifting process. The MFP 10' receives a G/O Negotiation request from the mobile terminal 100 in T500 prior to completing the G/O shifting process, and then in T502, it sends a G/O Negotiation response to the mobile terminal 100 to execute the G/O Negotiation with the mobile terminal 100. In this case, as a result of the G/O Negotiation, the mobile terminal 100 is determined to become the G/O. After this, in T510, the MFP 10' completes the G/O shifting process, and starts the operation as the G/O. Meanwhile, in T520, the mobile terminal 100 also starts the operation as the G/O according to the result of the G/O Negotiation. In this case, the WSC Exchange is not executed between the MFP 10' and the mobile terminal 100. The reason therefor is as follows. Prior to the WSC Exchange, a device operating as a client sends a signal for starting the WSC Exchange (e.g., a Probe request including WSCIE) to a device operating as the G/O. Under a situation where both the MFP 10' and the mobile terminal 100 are operating as the G/O, this signal is not communicated, as a result of which the WSC Exchange is not executed. Thus, the establishment of a WFD connection between the MFP 10' and the mobile terminal 100 thereby fails.

(Effects of Embodiment)

As mentioned above, some period of time (i.e., G/O shifting time (e.g., 1 to 2 seconds)) is needed in order for the MFP 10 to shift to the G/O state. As shown in the comparative example of FIG. 9, when the communication of the Probe response for establishing the WFD connection between the MFP 10' and the mobile terminal 100 (T462) is executed prior to the completion of the G/O shifting process, the establishment of the WFD connection between the MFP 10' and the mobile terminal 100 fails. With respect to this, in the present embodiment, as shown in the cases A and B in FIGS. 5 and 6, the MFP 10 prohibits the Listen process during the G/O shifting process (T44, T144). Accordingly, the sending of a Probe response is not executed before the completion of the shift of the MFP 10 to the G/O state. The establishment of the WFD connection can be suppressed from failing due to a Probe request being sent. Due to this, the MFP 10 can suitably establish the WFD connection with the mobile terminal 100, and can cause the mobile terminal 100 to participate as a child station in the WFD network in which the MFP 10 operates as the G/O.

Further, in the present embodiment, as shown in the case A of FIG. 5 to the case C of FIG. 7, the MFP 10 shifts to the G/O state in the case where the NFC connection with the mobile terminal 100 is established and the Write information is received from the mobile terminal 100 (or 200) in which the MFP app 140 has been installed. On the other hand, as shown in the case D of FIG. 8, the MFP 10 does not shift to the G/O state in the case where the Write information is not received from the mobile terminal 300 even when the NFC connection is established with the mobile terminal 300. As above, the MFP 10 does not shift to the G/O state even when the NFC connection is established with the mobile terminal 300 in which the MFP app 140 is not installed, that is, the mobile terminal 300 which cannot establish a WFD connection. Thus, a processing load on the MFP 10 can be suppressed from increasing.

(Correspondence Relationships)

The MFP 10, the mobile terminal 100, and the mobile terminal 200 are respectively an example of a "communication device", "first external device", and "second external device". The mobile terminal 300 and the mobile terminal 100 in the case D of FIG. 8 are respectively an example of "first external device" and "third external device". The NFC I/F 22 and the Wi-Fi I/F 20 are respectively an example of "first wireless interface" and "second wireless interface". The NFC connection in T12 of FIGS. 5 and 6, the WFD connection established in T90 of FIGS. 5 and 6, the NFC connection in T212 of FIG. 7, the Legacy connection established in T290 of FIG. 7, and the WFD connection in T394 of FIG. 8 are respectively an example of "first wireless connection", "second wireless connection", "third wireless connection", "fourth wireless connection", and "fifth wireless connection".

S200 of FIG. 4 is an example of a process executed by "shift an operation state of a communication device from a specific state to a G/O state in a case where a first wireless connection via the first wireless interface is established" and "shift the operation state of the communication device from the specific state to the G/O state in a case where a third wireless connection via the first wireless interface is established". S220 and S235 are respectively an example of a process executed by "establish a second wireless connection" and "establish a fourth wireless connection".

The SSID "X" is an example of "identification information". The Write information and the PBC information are respectively an example of "predetermined information" and "WFD device information". The MFP application 140 is an example of "application program". The WSC Exchange is an example of "password sending process", and the password "P" sent by the MFP 10 in the WSC Exchange of T90 of FIG. 5 and the password "P" in the Read information of T220 of FIG. 7 are respectively an example of "first password" and "second password". The G/O Negotiation request of T370 of FIG. 8 is an example of "specific signal".

(Variant 1) Each of the devices 10, 100, 200, 300 may be provided with an I/F for executing a wireless communication according to a communication scheme different from the NFC scheme (e.g., infrared ray scheme, TransferJet (registered trademark) scheme, a BlueTooth (registered trademark) scheme) instead of the NFC I/F. That is, "first communication interface" is not limited to the NFC I/F 22, and may be an I/F for executing a short-range wireless communication according to other communication scheme.

(Variant 2) The Read information in S50 of FIG. 2 and S150 of FIG. 3 may not include the SSID "X". In this case as well, the mobile terminal 100 can identify the Probe response including the received MAC address "A" in T80 of FIG. 5. In this variant, the MAC address "A" is an example of "identification information".

(Variant 3) In the above embodiment, the MFP 10 is assumed to establish wireless connections with both the WFD device and the Legacy device, however, in a variant, the MFP 10 may be configured to establish a wireless connection with only the WFD device. In this case, S205, S225 to S235 of FIG. 4 may be omitted. Further, since the MFP 10 sends the password to the WFD device in the WSC Exchange in S220 of FIG. 4, the Read information not including the password may be sent in S50 of FIG. 2 and S150 of FIG. 3. In this variant, and "shift the operation state of the communication device from the specific state to the G/O state in a case where a third wireless connection via the first wireless interface is established" and "establish a fourth wireless connection with the second external device" may be omitted.

(Variant 4) The NFC I/F of each of the devices 10, 100, 200, 300 may execute a communication corresponding to the communications of the Read information and the Write information by operating in the P2P mode.

(Variant 5) S165 to S180 of FIG. 3 may not be executed. That is, "cause the display unit to display an inquiry screen" and "establish the fifth wireless connection with the third external device" may be omitted.

(Variant 6) In S165 of FIG. 3, the MFP 10 may monitor the Service Discovery request or the Provision Discovery request instead of the G/O Negotiation request. In this variant, the Service Discovery request or the Provision Discovery request is an example of "specific signal".

(Variant 7) "Communication device" may not be an MFP, and it may be other device such as a printer, a scanner, a mobile terminal, a PC, a server, and the like.

(Variant 8) In the respective embodiments as above, the processes of FIGS. 2 to 8 are implemented by software (i.e., program 36), however, at least one of these processes may be implemented by hardware such as a logic circuit.

What is claimed is:

1. A communication device comprising:
    a first wireless interface;
    a second wireless interface configured to execute a wireless communication according to a Wi-Fi scheme, a maximum distance with which a wireless communication via the first wireless interface can be executed being smaller than a maximum distance with which a wireless communication via the second wireless interface can be executed;
    a processor; and
    a memory storing computer-readable instructions therein, the computer-readable instructions, when executed by the processor, causing the communication device to:
    shift an operation state of the communication device from a specific state to a G/O (abbreviation of Group Owner) state of a WFD (abbreviation of Wi-Fi Direct (registered trademark)) scheme conforming to the Wi-Fi scheme, in a case where a first wireless connection via the first wireless interface is established with a first external device under a situation where the operation state of the communication device is the specific state, and predetermined information is received from the first external device using the first wireless connection, the specific state being different from the G/O state,
    wherein in a case where the first external device is a device that has installed an application program for establishing a wireless connection via the second wireless interface with the communication device, the first external device sends the predetermined information to the communication device using the first wireless connection,
    wherein in a case where the first external device is a device that does not install the application program, the first external device does not send the predetermined information; and
    after the operation state of the communication device has shifted to the G/O state in response to receiving the predetermined information from the first external device, execute, via the second wireless interface, a first communication with the first external device for causing the first external device to participate as a client of the WFD scheme in a first wireless network in which the communication device operates as a G/O,
    wherein in a case where the predetermined information is not received from the first external device using the first wireless connection, the operation state of the communication device remains the specific state.

2. The communication device as in claim 1, wherein:
    the first wireless interface is configured to execute a wireless communication according to an NFC (abbreviation of Near Field Communication) scheme, and
    the predetermined information is Write information according to a Write command of the NFC scheme.

3. The communication device as in claim 1, wherein:
    the first wireless interface is configured to send identification information to the first external device using the first wireless connection, the identification information being for identifying a first wireless network, and
    the operation state of the communication device is shifted from the specific state to the G/O state so as to form the first wireless network identified by the identification information sent by the first wireless interface.

4. The communication device as in claim 3, wherein:
    the first wireless interface is configured to execute a wireless communication according to an NFC (abbreviation of Near Field Communication) scheme, and
    the first wireless interface is configured to send first Read information according to a Read command of the NFC scheme to the first external device using the first wireless connection, the first Read information including the identification information.

5. The communication device as in claim 1, wherein:
    after the operation state has shifted to the G/O state in response to receiving the predetermined information including WFD device information from the first external device which is a WFD device capable of executing a wireless communication according to the WFD scheme, the first communication is executed with the first external device, and
    the computer-readable instructions, when executed by the processor, further cause the communication device to:
    shift the operation state of the communication device from the specific state to the G/O state in a case where a second wireless connection via the first wireless interface is established with a second external device under the situation where the operation state of the communication device is the specific state, and the predetermined information not including the WFD device information is received from the second external device using the second wireless connection, the second external device being different from the first external device and being a Legacy device incapable of executing a wireless communication according to the WFD scheme, wherein the operation state of the communication device remains the specific state in a case where the predetermined information is not received from the second external device using the second wireless connection; and after the operating state of the communication device has shifted to the G/O state in response to receiving the predetermined information not including the WFD device information from the second external device, execute, via the second wireless interface, a second communication with the second external device for causing the second external device to participate as a Legacy device of the Wi-Fi scheme in a second wireless network in which the communication device operates as a G/O.

6. The communication device as in claim 5, wherein:

the first communication includes sending a first password to be used in a first wireless network to the first external device via the second wireless interface and the causing of the first external device to participate as the client of the WFD scheme in the first wireless network uses the first password sent in the first communication, the first wireless interface is configured to send a second password to be used in a second wireless network to the second external device using the second wireless connection, and the second communication does not include sending the second password to the second external device via the second wireless interface and the causing of the second external device to participate as the Legacy device of the Wi-Fi scheme in the second wireless network uses the second password.

7. The communication device as in claim 6, wherein the first wireless interface is configured to execute a wireless communication according to an NFC (abbreviation of Near Field Communication) scheme, and the first wireless interface is configured to send second Read information according to a Read command of the NFC scheme to the second external device using the second wireless connection, the second Read information including the second password.

8. The communication device as in claim 1, further comprising a display unit, wherein the computer-readable instructions, when executed by the processor, further cause the communication device to:

cause the display unit to display an inquiry screen in a case where:

the first wireless connection is established with the first external device;

the predetermined information is not received from the first external device using the first wireless connection; and a specific signal is received from the first external device via the second wireless interface, the inquiry screen being a screen for inquiring of a user whether the first communication via the second wireless interface is to be executed with the first external device; and execute the first communication with the first external device in a case where it is selected by the user on the inquiry screen that the first communication is to be executed with the first external device, wherein the first communication is not executed in a case where it is not selected by the user that the first communication is to be executed with the first external device on the inquiry screen, and the first communication is executed with the first external device without displaying the inquiry screen in the case where the first wireless connection is established with the first external device and the predetermined information is received from the first external device using the first wireless connection.

9. A non-transitory computer-readable recording medium storing computer-readable instructions for a communication device, wherein the computer-readable instructions, when executed by a processor of the communication device, cause the communication device to:

shift an operation state of the communication device from a specific state to a G/O (abbreviation of Group Owner) state of a WFD (abbreviation of Wi-Fi Direct (registered trademark)) scheme conforming to a Wi-Fi scheme, in a case where a first wireless connection via a first wireless interface of the communication device is established with a first external device under a situation where the operation state of the communication device is the specific state, and predetermined information is received from the first external device using the first wireless connection, the specific state being different from the G/O state, the first wireless interface being a wireless interface configured to execute a wireless communication with another device located at a first distance, a maximum distance with which a wireless communication via the first wireless interface can be executed being smaller than a maximum distance with which a wireless communication via a second wireless interface can be executed, the second wireless interface being a wireless interface configured to execute a wireless communication according to the Wi-Fi scheme, wherein in a case where the first external device is a device that has installed an application program for establishing a wireless connection via the second wireless interface with the communication device, the first external device sends the predetermined information to the communication device using the first wireless connection, wherein in a case where the first external device is a device that does not install the application program, the first external device does not send the predetermined information; and after the operation state of the communication device has shifted to the G/O state in response to receiving the predetermined information from the first external device, execute, via the second wireless interface, a first communication with the first external device for causing the first external device to participate as a client of the WFD scheme in a first wireless network in which the communication device operates as a G/O, wherein in a case where the predetermined information is not received from the first external device using the first wireless connection, the operation state of the communication device remains the specific state.

10. A method executed by a communication device, the method comprising:

shifting an operation state of the communication device from a specific state to a G/O (abbreviation of Group Owner) state of a WFD (abbreviation of Wi-Fi Direct (registered trademark)) scheme conforming to a Wi-Fi scheme, in a case where a first wireless connection via a first wireless interface of the communication device is established with a first external device under a situation where the operation state of the communication device is the specific state, and predetermined information is received from the first external device using the first wireless connection, the specific state being different from the G/O state, the first wireless interface being a wireless interface configured to execute a wireless communication with another device located at a first distance, a maximum distance with which a wireless communication via the first wireless interface can be executed being smaller than a maximum distance with which a wireless communication via a second wireless interface can be executed, the second wireless interface being a wireless interface configured to execute a wireless communication according to the Wi-Fi scheme, wherein in a case where the first external device is a device that has installed an application program for establishing a wireless connection via the second wireless interface with the communication device, the first external device sends the predetermined information to the communication device using the first wireless connection, wherein in a case where the first external device is a device that does not install the application program, the first external device does not send the predetermined information; and after the operation state of the communication device has shifted to the G/O state in response to receiving the predetermined information from the first external device, execute, via the second wireless interface, a first communication with the first external device for causing the first external device to participate as a client of the WFD scheme in a first wireless network in which the communication device operates as a G/O, wherein in a case where the predetermined information is not received from the first external device using the first wireless connection, the operation state of the communication device remains the specific state.

* * * * *